J. C. H. LYNDGAARD.
MILK STOOL.
APPLICATION FILED SEPT. 1, 1911.
1,019,009.
Patented Feb. 27, 1912.
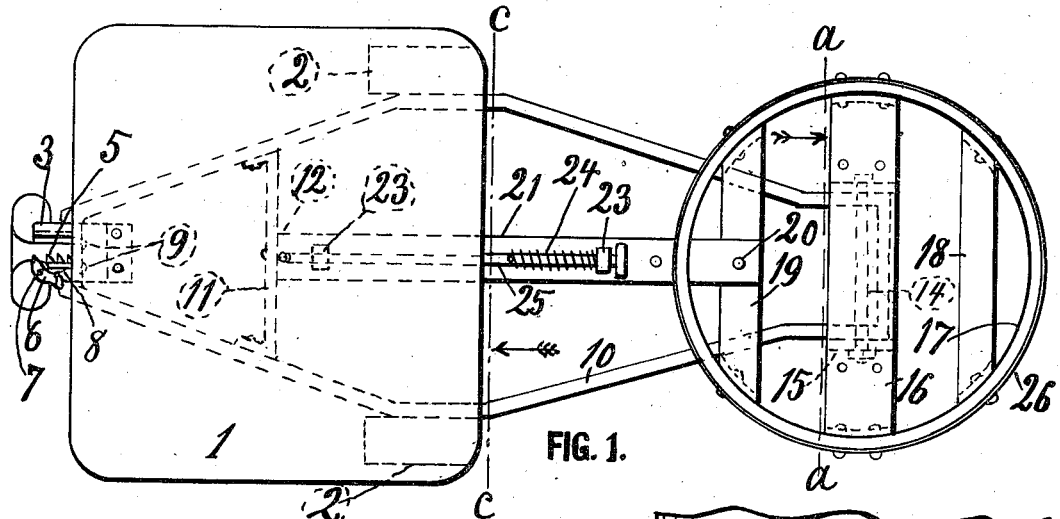
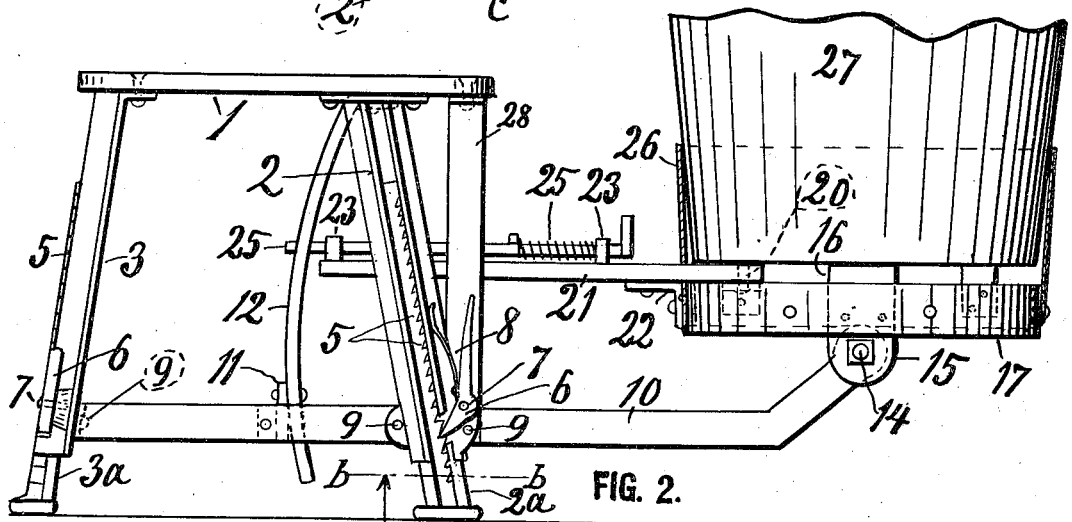
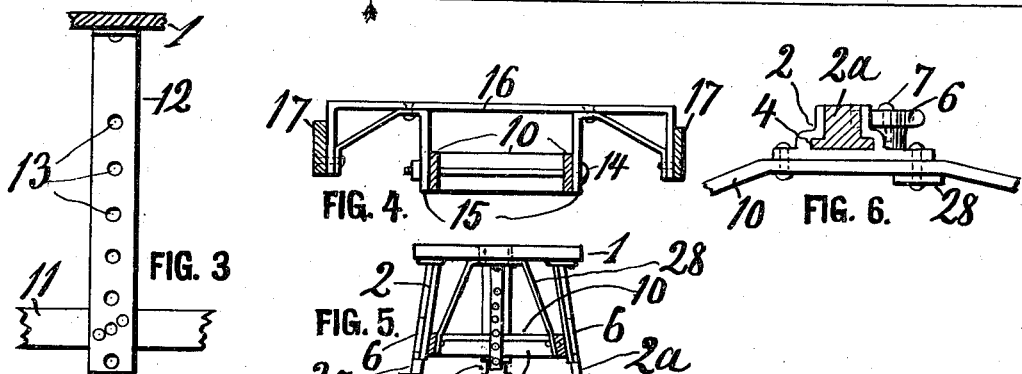
WITNESSES:
M. M. Carlsen
A. E. Carlsen
INVENTOR.
Jorgen C. H. Lyndgaard.
BY his ATTORNEY:
A. M. Carlsen.

UNITED STATES PATENT OFFICE.

JORGEN C. H. LYNDGAARD, OF LAKE BENTON, MINNESOTA.

MILK-STOOL.

1,019,009.  Specification of Letters Patent.  Patented Feb. 27, 1912.

Application filed September 1, 1911. Serial No. 647,262.

*To all whom it may concern:*

Be it known that I, JORGEN C. H. LYNDGAARD, a citizen of the United States, residing at Lake Benton, in the county of Lincoln and State of Minnesota, have invented a new and useful Milk-Stool, of which the following is a specification.

My invention relates to milk-stools of the class that supports the milk-vessel during the process of milking.

The object is to produce a compact, durable, convenient and efficient device of said class.

In the accompanying drawing,—Figure 1 is a top or plan view of my improved milk-stool. Fig. 2 is a side elevation of the stool shown in Fig. 1 with the lower portion of a milk pail in position on the pail support, and the guard about the pail in substantially diametrical section. Fig. 3 is a front elevation of the curved bar 11 in Fig. 2, and fractions of adjacent parts. Fig. 4 is a section on the line *a—a* Fig. 1. Fig. 5 is a section on the line *c—c* Fig. 1, on a reduced scale and the tongue or arm 21 omitted. Fig. 6 is a slightly enlarged section looking upward at the line *b—b* Fig. 2.

Referring to the drawing by reference numerals, 1 designates the seat, 2, 2ª the front legs 3, 3ª the rear leg supporting the seat. Each leg is made extensible by having its lower section 2ª or 3ª slidable in a channel 4 (see Fig. 6) in the upper section and formed at one side with ratched teeth 5, in which engages a dog 6 that is pivotally mounted at 7 on the upper section and held in engagement with the teeth by a spring 8, which may be secured either on the dog or on the upper leg-section. Secured at 9 to the lower ends of the upper leg sections is a horizontal yoke or frame 10, which has a transverse bar 11; secured to said bar and to the seat is a vertically disposed segmentally curved brace 12 with perforations 13, as best shown in Fig. 3. The center of said segment is the axial line of a pivot bolt 14 that is passed through the upwardly curved front end of the yoke 10 and through the downward lugs 15 of a bar 16, which is secured diametrically in a ring 17. In said ring are also secured two other bars 18 and 19. To the latter bar is secured at 20 an arm 21, a bracket 22 (shown in Fig. 2) also assist in securing said arm 21 to the ring 17. Sliding in lugs 23 upon the bar 21 and pressed rearwardly by a spring 24 is a locking bolt 25, whose rear end may engage in any of the apertures 13 of bar 12. Secured about the ring 17 is a circular sheet metal guard 26, within which the milk pail 27 is placed upon the bar 16, 18 and the rear portion of the arm 21. The guard 26 is sufficiently high and fitting about the pail to prevent overturning of the pail as long as the stool remains in anything like normal position and it will of course remain in said position as long as the operator sits on it and when he leaves the stool he takes it and the pail, or at least the latter along with him, so it is simply impossible for a cow to kick the pail over.

28 is a brace between the front legs and the seat.

In the use of the device it may be further explained that according as the cow is a big or a small one it is often desirable to tilt the pail toward or away from the cow; this is then done by moving the locking bolt 24 into a higher or lower aperture in the bar 12. Such shifting of the bolt also enables the pail to stand plumb up when so desired even if the ground inclines toward or away from the cow. The extensibility of the legs enables the operator to raise and lower the seat and the pail-holding frame and also to maintain the seat in level position even if the ground slopes to the right or left of the operator or in any other direction.

What I claim is:

1. A milk stool comprising a seat and three legs supporting the same, each leg composed of an upper section fixed to the seat and a lower section slidable on the upper section, and means for holding the sections extended to different lengths.

2. A milk stool comprising a seat and three legs supporting the same, each leg composed of an upper section fixed to the seat and a lower section slidable on the upper section, and means for holding the sections extended to different lengths, a horizontal frame secured to the upper sections of the legs and extending forward beyond the seat, a pail support mounted on said forward extension and having a guard arranged to encircle the lower portion of the pail, for the purpose set forth.

3. A milk stool comprising a seat and three legs supporting the same, each leg composed of an upper section fixed to the seat and a lower section slidable on the upper section, and means for holding the sections extended to different lengths, a horizontal frame secured to the upper sections of the legs and extending forward beyond the seat, a pail support mounted on said forward extension and having a guard arranged to encircle the lower portion of the pail, for the purpose set forth, a segmental perforated bar below the seat, an arm on the pail support, spring-pressed means carried by the arm and arranged for engagement with either of the perforations in the segmental bar, said pail support being pivotally mounted on the frame to tilt to and from the seat.

In testimony whereof I affix my signature, in presence of two witnesses.

JORGEN C. H. LYNDGAARD.

Witnesses:
M. J. HANSEN,
CHAS. E. LAVESSON.